US011070651B2

(12) United States Patent
Loynd et al.

(10) Patent No.: US 11,070,651 B2
(45) Date of Patent: *Jul. 20, 2021

(54) CONTRACTOR DATA SERVER AND METHODS FOR USE THEREWITH FOR GENERATING INDIVIDUAL SCORING DATA

(71) Applicants: Michael David Loynd, Concord, MA (US); Judith Lynn Stuckman, Austin, TX (US); Bruce Edward Stuckman, Austin, TX (US)

(72) Inventors: Michael David Loynd, Concord, MA (US); Judith Lynn Stuckman, Austin, TX (US); Bruce Edward Stuckman, Austin, TX (US)

(*) Notice: Subject to any disclaimer, the term of this patent is extended or adjusted under 35 U.S.C. 154(b) by 166 days.

This patent is subject to a terminal disclaimer.

(21) Appl. No.: 16/407,575

(22) Filed: May 9, 2019

(65) Prior Publication Data
US 2019/0268443 A1  Aug. 29, 2019

Related U.S. Application Data

(63) Continuation of application No. 14/568,920, filed on Dec. 12, 2014, now Pat. No. 10,334,077.
(Continued)

(51) Int. Cl.
*H04L 29/08* (2006.01)
*H04L 29/06* (2006.01)
(Continued)

(52) U.S. Cl.
CPC ........... *H04L 67/42* (2013.01); *G06Q 10/063* (2013.01); *G06Q 10/10* (2013.01); *G06Q 30/02* (2013.01);
(Continued)

(58) Field of Classification Search
CPC ..... H04L 67/42; H04L 67/306; G06Q 10/063; G06Q 10/10; G06Q 30/02; G06Q 30/06; G06Q 30/0282; G06Q 50/08; G06Q 50/16
(Continued)

(56) References Cited

U.S. PATENT DOCUMENTS

2003/0065522 A1* 4/2003 Wepfer ................. G06Q 10/10
705/29
2007/0299715 A1* 12/2007 Brucato ............. G06Q 30/0204
705/7.33
(Continued)

*Primary Examiner* — Hares Jami
(74) *Attorney, Agent, or Firm* — Garlick & Markison; Bruce E. Stuckman

(57) ABSTRACT

A contractor data server includes at least one processor that executes a contractor data server application to bidirectionally communicate contractor data with a first user of a first client device via a network interface. The contractor data includes service menu data sent to the first client device that includes a plurality of service types and a plurality of specific services and service data received from the first client device indicates a selected one of the plurality of service types, a selected one of the plurality of specific services that indicates a service performed, service date data that indicates a service date, service address data that indicates a service address, and contractor review data relating to services performed at the service address. The contractor data server application processes the contractor review data to generate individual scoring data relating to the service address.

18 Claims, 13 Drawing Sheets

Related U.S. Application Data

(60) Provisional application No. 61/917,170, filed on Dec. 17, 2013.

(51) Int. Cl.
*G06Q 10/06* (2012.01)
*G06Q 50/16* (2012.01)
*G06Q 30/02* (2012.01)
*G06Q 50/08* (2012.01)
*G06Q 30/06* (2012.01)
*G06Q 10/10* (2012.01)

(52) U.S. Cl.
CPC ............. *G06Q 30/06* (2013.01); *G06Q 50/08* (2013.01); *G06Q 50/16* (2013.01); *H04L 67/306* (2013.01)

(58) Field of Classification Search
USPC .................................................. 707/736, 748
See application file for complete search history.

(56) References Cited

U.S. PATENT DOCUMENTS

| | | | | |
|---|---|---|---|---|
| 2010/0280959 | A1* | 11/2010 | Stone | G06Q 30/06 705/80 |
| 2010/0306138 | A1* | 12/2010 | Hotes | G06Q 30/0206 706/12 |
| 2013/0290214 | A1* | 10/2013 | Clavin | G06Q 30/00 705/347 |
| 2014/0279571 | A1* | 9/2014 | Cox | G09B 29/007 705/305 |

\* cited by examiner

Mike'sList.com 310

Logged in as:
Bob Robertson Home Repairs 312

Date of service:
January 2, 2013 312

*Click-on Tools* 302

Review for: 314
William Williamson
1234 Schlee St.
Algonquin, IL 60102

Please rate your overall experience
4 is best, 1 is worst

1 ☒  2 ☐  3 ☐  4 ☐

Enter comments below

Had payment problems; would never work for this customer again, AVOID!

next 316

FIG. 5

Mike'sList.com — 320

*Click-on Tools* — 302

Logged in as:
Bob Robertson Home Repairs

Date of service:
January 2, 2013 — 322

Review for:
William Williamson
1234 Schlee St.
Algonquin, IL 60102

- Y ☐ N ☒ Were there problems with the customer not meeting appointments and/or making the work-site available during work hours?
- Y ☐ N ☒ Were there problems with change orders?
- Y ☐ N ☒ Did the customer refuse access to toilet facilities?
- Y ☐ N ☒ Were there problems with pets in the work area?
- Y ☒ N ☐ Were there problems with payment?

next — 316

FIG. 6

Mike'sList.com — 330

Logged in as:
Bob Robertson Home Repairs

Date of service:
January 2, 2013

*Click-on Tools* — 302

Review for:
William Williamson
1234 Schlee St.
Algonquin, IL 60102

332

Rate this payment problem:
1 worst to 4 best

1 ☒  2 ☐  3 ☐  4 ☐

Comments

Refused to make final payment, ducked calls, had to take to collections next — 316

FIG. 7

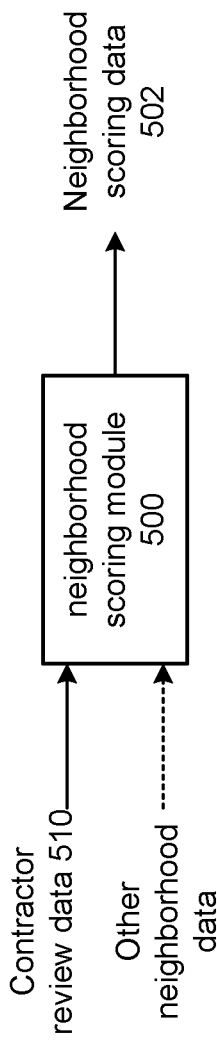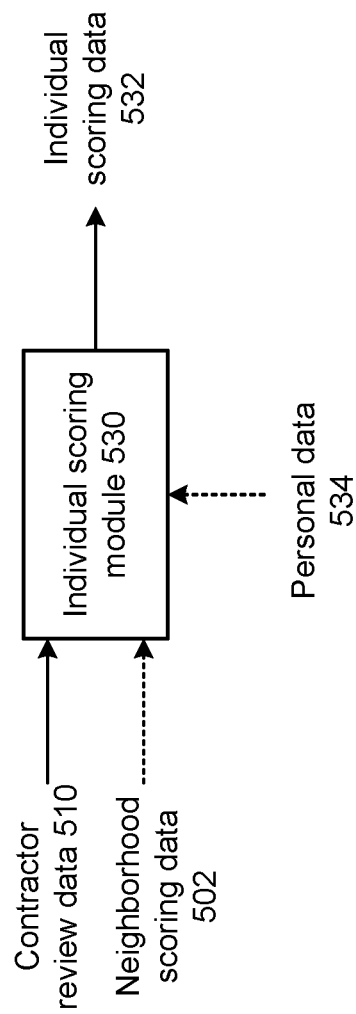
FIG. 8
FIG. 9

CONTRACTOR DATA SERVER AND METHODS FOR USE THEREWITH FOR GENERATING INDIVIDUAL SCORING DATA

CROSS REFERENCE TO RELATED PATENTS

The present U.S. Utility patent application claims priority pursuant to 35 U.S.C. § 120 as a continuation of U.S. Utility application Ser. No. 14/568,920, entitled "CONTRACTOR DATA SERVER AND METHODS FOR USE THERE-WITH", filed Dec. 12, 2014, which claims priority pursuant to 35 U.S.C. § 119(e) to U.S. Provisional Application No. 61/917,170, entitled "CONTRACTOR DATA SERVER AND METHODS FOR USE THEREWITH", filed Dec. 17, 2013, both of which are hereby incorporated herein by reference in their entirety and made part of the present U.S. Utility patent application for all purposes.

TECHNICAL FIELD

The present disclosure relates to knowledge based systems and databases used in conjunction with client/server network architectures.

DESCRIPTION OF RELATED ART

Many contractors have adopted online tools to allow customers with service needs to identify and select them. Contractor websites typically include information on services provided by the contractor and contact information to schedule service calls along with other information of the contractor. Other services, such as Angieslist.com allows customers to provide reviews of contractor performance. A customer in need of service can access online reviews of a particular contractor's performance and use this information to select a particular contractor.

Contractors themselves can have bad experiences with customers. In particular, a customer may not be prepared to provide full payment at the time the service is completed or otherwise cause problems for the contractor at the time the service is performed.

BRIEF DESCRIPTION OF THE SEVERAL VIEWS OF THE DRAWINGS

FIG. 5 presents a graphical representation of screen display 310 in accordance with an embodiment of the present disclosure.

FIG. 6 presents a graphical representation of screen display 320 in accordance with an embodiment of the present disclosure.

FIG. 7 presents a graphical representation of screen display 330 in accordance with an embodiment of the present disclosure.

FIG. 8 presents a block diagram representation of a neighborhood scoring module 500 in accordance with an embodiment of the present disclosure.

FIG. 9 presents a block diagram representation of an individual scoring module 530 in accordance with an embodiment of the present disclosure.

DETAILED DESCRIPTION

Figure 1:
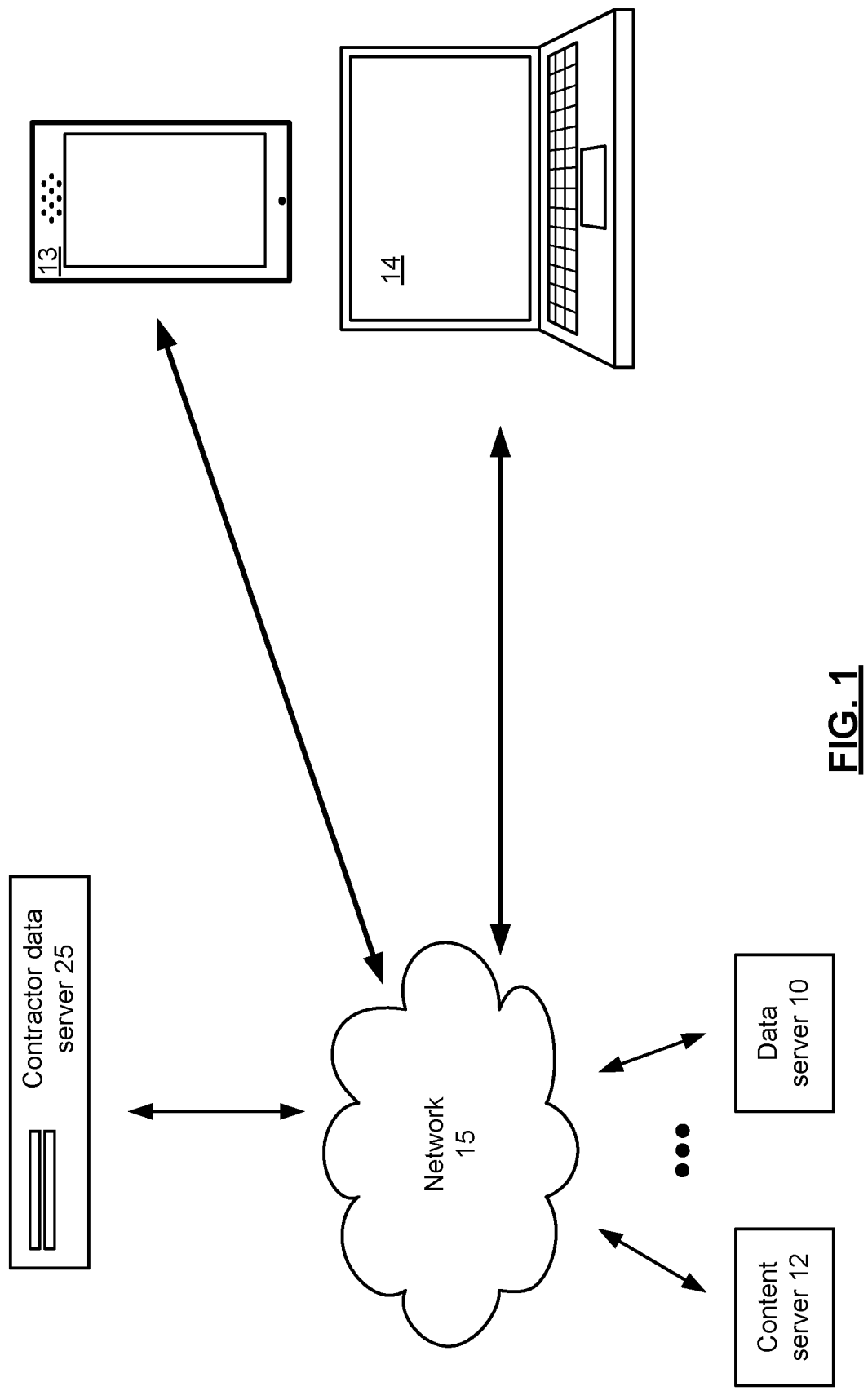
FIG. 1 presents a pictorial representation of a system that includes a contractor data server 25 and example devices 13-14 that operate in accordance with embodiments of the present disclosure.

FIG. 1 presents a pictorial representation of a contractor data server 25 and example devices 13-14 that operate in accordance with embodiments of the present disclosure. In particular, a contractor data server 25 is presented that communicates with client devices such as mobile terminal 13 and personal computer 14 via network 15. The network 15 can be the Internet or other wide area communication network. The contractor data server 25 presents a website that operates via a browser application of mobile terminal 13 and/or personal computer 14 or that otherwise operates in conjunction with an application such as a mobile application selected for download by the user and downloaded to the client device to present and gather contractor data that includes information on the services performed by the contractor, information on the service address and/or persons that the services were performed for, and also review of the service experience from the perspective of the contractor.

The contractor data can be processed in conjunction with other contractor data and other forms of data and used to generate individual scores relating to the customer address and/or the customers themselves. The individual scores can indicate, for example, how a customer has treated past contractors and/or the nature of problems that a customer has caused in the past in addition to the types of repairs that have been performed and their frequency. These scores can be used by prospective contractors to settle potential issues before services are performed and/or used to avoid problem customers. Neighborhood scores can be generated that can be used in generating the individual scores and/or used independently to provide aggregate information of neighborhood repairs and service.

In addition, the contractor data can be used for other purposes. Summaries of home service data for a particular address can be provided to potential home buyers in the evaluation of a potential home purchase, to home owner warranty companies to evaluate risk levels, by governmental agencies in determining the condition of the home and the level of upgrades, and by others interested in accessing service and/or repair data for other purposes.

In an embodiment, a user such as a home contractor that provides home services or other service persons can register with the contractor data server 25, such as via an email address, and password. After services are performed, contractor data in the form of service menus prompts are presented to the client device for display relating to various information to be entered relating to the contractor's service experience.

In an embodiment, the contractor data server 25 communicates with one or more content servers 12 and other data servers 10. These content servers 12 can include a social networking server such as Facebook, MySpace, Twitter; an advertising server; and other servers that provide information relating to contractors, to services, to customers, to neighborhoods, to maps and directions for locating customers, and/or other content. The data servers 10, can each be a web server or other server provide data such as neighborhood demographic data, individual credit data or other data. While shown as a separate device, the functionality of contractor data server 25 can be implemented in or on conjunction with a particular content server 12 or data server 10.

Contractor data server 25 and client devices 13 and 14 will be described in greater detail in conjunction with FIGS. 2-14, including several optional functions and features.

Figure 2:
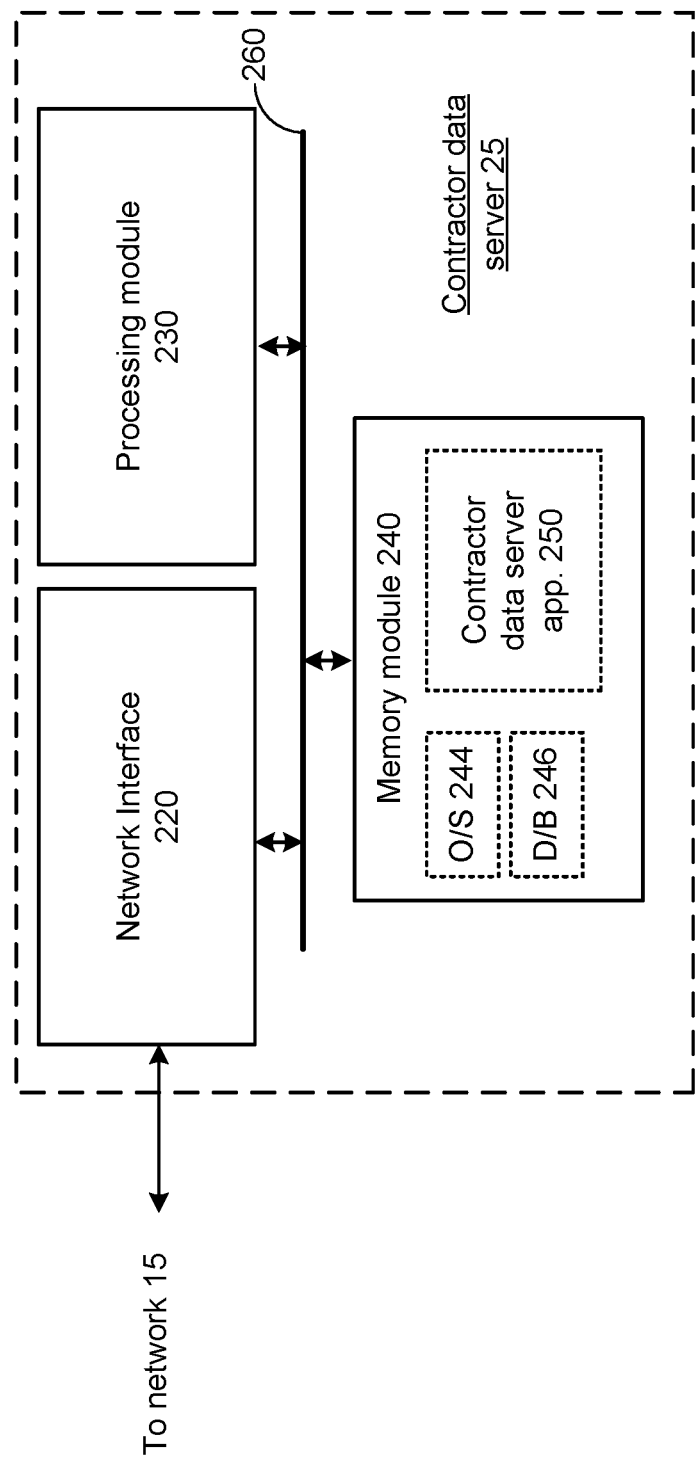
FIG. 2 presents a block diagram representation of a contractor data server 25 in accordance with an embodiment of the present disclosure.

FIG. 2 presents a block diagram representation of a contractor data server 25 in accordance with an embodiment of the present disclosure. In particular, contractor data server 25 includes a network interface 220 such as a network card or modem for communicating with client devices such as client devices 13 or 14, other servers such as content servers 12 and/or data servers 10 via network 15. The contractor data server 25 also includes a processing module 230 and memory module 240 that stores an operating system 244 such as a Linux or Microsoft operating system or other operating system, a database 246 for storing data such as contractor review data, addresses, scoring data and other data as well as a contractor data server application 250.

The processing module 230 can be implemented via a single processing device or a plurality of processing devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory 240. The memory can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 260, other architectures are possible including additional data buses and/or direct connectivity between one or more elements. Further, the contractor data server 25 can include one or more additional elements that are not specifically shown.

At least one processor of the processing module 230 executes the contractor data server application 250 to bidirectionally communicate contractor data with a user of a client device, such as client device 13 or 14 via the network interface 220 and the network 15. In operation, the contractor data server application 250 sends contractor data in the form of service menu data to a client device, such as client device 13 or 14, via the network 15. The service menu data can include a plurality of service types and a plurality of specific services. Service data is received by the contractor data server application 250 via the network 15 from the client device. This service data can, for example, indicate a selected one of the plurality of service types, a selected one of the plurality of specific services that indicates a service performed, service date data that indicates a service date, service address data that indicates a service address, and contractor review data relating to services performed at the service address. The contractor data server application 250 processes the service data and contractor review data to generate individual scoring data relating to the service address.

In an embodiment, wherein the contractor data server application 250 processes the contractor review data in conjunction with other contractor review data from at least one other user to the generate individual scoring data relating to the service address. The contractor data server application 250 can process the contractor review data in conjunction with neighborhood scoring data from at least one other service address to the generate individual scoring data relating to the service address. The contractor data server application 250 can optionally retrieve personal data pertaining to a person associated with the service address and the contractor data server application can process the contractor review data in conjunction with the personal data to the generate individual scoring data relating to the service address.

In a mode of operation, the individual scoring data is generated based on at least a portion of the contractor review data. For example, the individual scoring data can estimate homeowner conduct with contractors at the service address. Further, the contractor data server application 250 can send the individual scoring data to other users of other client devices via the network interface 220.

In a mode of operation, the contractor data server application 250 sends the selected one of the plurality of specific services, the service date data, and the service address data to another user of another client device via the network interface. The contractor data server application can also generates repair summary data that summarizes repairs performed at the service address that can be accessed by authorized users of the contractor data server 25. The contractor data server application 250 optionally generates neighborhood scoring data relating to the service address that can be used to generate the individual scoring data or can otherwise be shared with authorized users of the contractor data server 25.

The operation of contractor data server 25 in generating and responding to contractor data will be described in greater detail in conjunction with FIGS. 3-14, including several optional functions and features.

Figure 3:
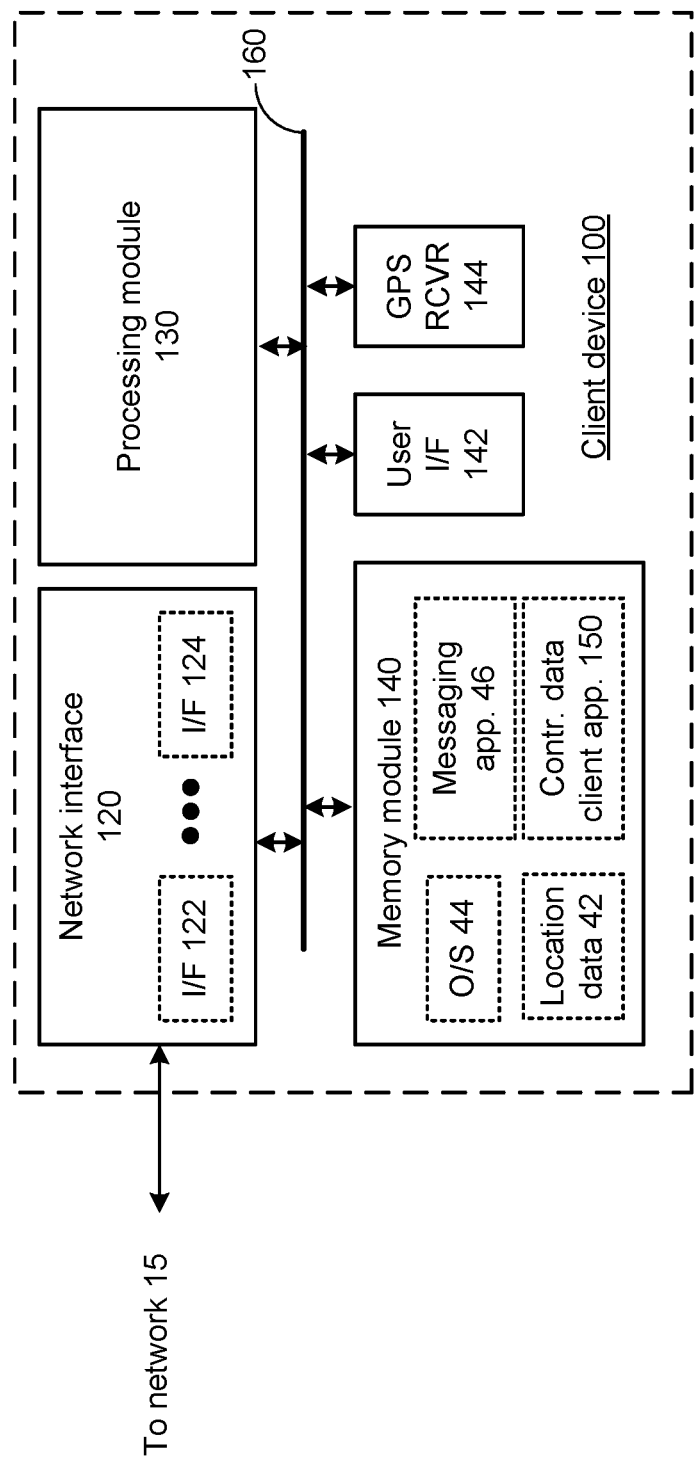
FIG. 3 presents a block diagram representation of a client device 100 in accordance with an embodiment of the present disclosure.

FIG. 3 presents a block diagram representation of a client device 100 in accordance with an embodiment of the present disclosure. In particular, a client device 100, such as mobile terminal 13, personal computer 14 or other client device such as a personal digital assistant, tablet, or smartphone is presented. The client device 100 includes a network interface 120 having one or more interfaces (122, 124 . . . ). Examples of interfaces (122, 124 . . . ) include wireless interfaces such as a 3G, 4G or other wireless telephony transceiver, a Bluetooth transceiver, a WiFi transceiver, UltraWideBand transceiver, WIMAX transceiver, ZigBee transceiver or other wireless interface. Examples of interfaces (122, 124 . . . ) further include wired interfaces such as a Universal Serial Bus (USB) interface, an IEEE 1394 Firewire interface, an Ethernet interface or other network card or modem for communicating with contractor data server 25, or other servers such as content servers 12 via network 15. The client device 100 also includes a user interface such as a display device, touch screen, key pad, touch pad, thumb wheel, one or more buttons, a speaker, a microphone, an accelerometer, gyroscope or other motion or position sensor, or other interface devices that provide information to a user of the client device 100 and that generate data in response to the user's interaction with the client device 100.

The client device 100 also includes a processing module 130 and memory module 140 that stores an operating system 44 such as a Linux-based operating system, a Microsoft personal computer or mobile operating system, an Android operating system, an Apple mobile or personal computer operating system or other operating system. The memory module 140 also stores location data 42 corresponding to the location of the client device 100 generated via user interaction with user interface 142, via optional Global Positioning System (GPS) receiver 144, or gathered via a wireless network such as triangulation data received from a 4G network, location information from a connected access point or base station, femtocell or other location data. In addition, memory module 140 includes a messaging application 46 for communicating with other client devices such as an email application, a text, instant messaging or short messaging service (SMS) application or other messaging application that stored contacts data corresponding to users of other client devices that are known to the user of client device 100.

The memory module 140 also stores a contractor data client application 150 that is prestored in the memory module, loaded via disk or downloaded to the memory module via network interface 120. The contractor data client application 150 can be a general browser application such as Mozilla, Google Chrome, Safari, Internet Explorer or other general web browser or an application that is customized to operate in conjunction with contractor data server 25 in conjunction with the exchange of contractor data.

The processing module 130 can be implemented via a single processing device or a plurality of processing devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory of memory module 140. The memory can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 160, other architectures are possible including additional data buses and/or direct connectivity between one or more elements. Further, the client device 100 can include one or more additional elements that are not specifically shown.

The operation of client device in generating and responding to contractor data will be described in greater detail in conjunction with FIGS. 4-14, including several optional functions and features.

Figure 4:
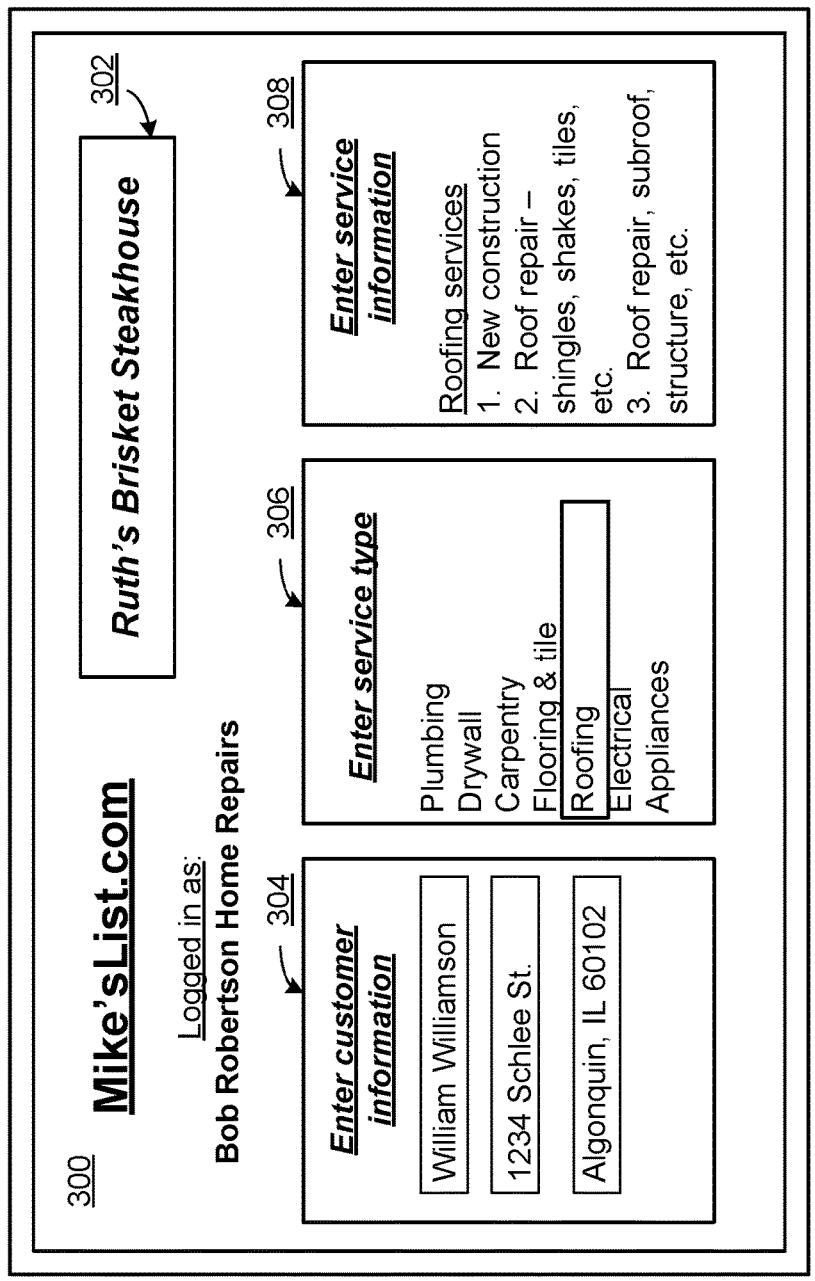
FIG. 4 presents a graphical representation of screen display 300 in accordance with an embodiment of the present disclosure.

FIG. 4 presents a graphical representation of screen display 300 in accordance with an embodiment of the present disclosure. In particular, a screen display 300 of user interface 142 of client device 100 is presented as generated by the contractor data client application 150 in response to contractor data from the contractor data server application 250. As shown, a user, "Bob Robertson Home Repairs" has logged in. This login can, for example, be based on the entry of a username and password, based on a cookie file retrieved from the memory module 240 of the client device 100 or based on other subscription information or authentication procedures. The screen display 300 is one in a number of different screen displays that guide the user in entering contractor data relating to service that has been performed by the user to a particular customer or at a particular service address.

The screen display 300 includes a banner ad 302 generated based on data from content server 12, and optionally based on location data 42 received from client device 100 via the network 15 and/or user profile data relating to the user of client device 100 stored in conjunction with user's subscription. In a mode of operation, the banner ad 302 presents an advertisement pertaining to products and services local to the user and further based on profile data that indicates the services that the user performs and other profile or user preferences.

Section 304 provides a graphical user interface for the user to enter customer information in the form of customer name data that indicates the name of the customer and/or service address data that indicates an address where the service was performed. Section 306 provides a graphical user interface for the user to enter service type data such as a selection of one or more of a plurality of different service types. Section 308 provides a graphical user interface for the user to select specific service data such as a selection of one or more of a plurality of specific services performed. In the embodiment shown, selection of the service type in section 306 automatically populates section 308 with specific services relating to that service type that can be selected by the user to describe the specific services performed.

In the example shown, the user has selected a service type "roofing" and can select specific roofing services such as new construction, roof repair—shingles, shakes, tiles, roof repair—subroof, structure, etc. It should be noted that the particular service types and specific services shown are merely illustrative of the many types of home services that could be selected in accordance with various embodiments of the present disclosure.

A next button 316 is presented that, when selected by the user, sends the contractor data entered by the user in accordance with this screen display to the contractor data server 25 via the network 15. In response, the contractor data server 25 can send a new screen display that, if applicable, includes contractor data with additional service menu data.

FIG. 5 presents a graphical representation of screen display 310 in accordance with an embodiment of the present disclosure. In particular, a screen display 310 of user interface 142 of client device 100 is presented as generated by the contractor data client application 150 in response to contractor data from the contractor data server application 250. Common elements from other figures may be indicated by common reference numerals. The screen display 310 is one in a number of different screen displays that guide the user in entering contractor data relating to service that has been performed by the user to a particular customer or at a particular service address.

Screen display 310 reflects that the user Bob Robertson Home Repairs has logged in and has previously entered customer name data and service address data. In section 312 the user enters service date data that indicates the date that service was performed, or if multiple days, the date the service was completed. In section 314, the user enters contractor review data. In the example shown, the customer review data includes a numerical customer rating along with comments data. While a numerical rating is shown, other discrete or continuous ratings can be presented in conjunction with a discrete or continuous rating scale.

FIG. 6 presents a graphical representation of screen display 320 in accordance with an embodiment of the present disclosure. In particular, a screen display 320 of user interface 142 of client device 100 is presented as generated by the contractor data client application 150 in response to contractor data from the contractor data server application 250. Common elements from other figures may be indicated by common reference numerals. The screen display 320 is one in a number of different screen displays that guide the user in entering contractor data relating to service that has been performed by the user to a particular customer or at a particular service address.

Screen display 320 reflects that the user Bob Robertson Home Repairs has logged in and has previously entered customer name data and service address data and service date data that indicates the date that service was performed, or if multiple days, the date the service was completed. In section 322, the user enters contractor review data. In the example shown, the customer review data includes a list of potential problems and prompts for indications from the user if any of these problems occurred. While the example shown includes lists of potential problems, the prompts could likewise indicate positive attributes of the service experience.

FIG. 7 presents a graphical representation of screen display 330 in accordance with an embodiment of the present disclosure. In particular, a screen display 330 of user interface 142 of client device 100 is presented as generated by the contractor data client application 150 in response to contractor data from the contractor data server application 250. Common elements from other figures may be indicated by common reference numerals. The screen display 330 is one in a number of different screen displays that guide the user in entering contractor data relating to service that has been performed by the user to a particular customer or at a particular service address.

Screen display 330 reflects that the user Bob Robertson Home Repairs has logged in and has previously entered customer name data and service address data and service date data that indicates the date that service was performed, or if multiple days, the date the service was completed. In section 332, the user enters contractor review data to follow-up on problems identified and included in contractor review data generated by interaction with display screen 320 and sent to the contractor data server 25. In the example shown, the customer review data includes a numerical rating of the severity of the problem along with comments data. While a numerical rating is shown, other discrete or continuous ratings can be presented in conjunction with a discrete or continuous rating scale.

FIG. 8 presents a block diagram representation of a neighborhood scoring module 500 in accordance with an embodiment of the present disclosure. In particular, neighborhood scoring module 500 can be implemented as part of the contractor data server application 250 or otherwise executed by processing module 230 of contractor data server 25. In operation, the neighborhood scoring module 500 receives contractor data 510 from the contractor data server application in the form of customer name data, service address data, service data date, service type data, specific service data and contractor review data and further receives other neighborhood data 512 from either one or more content servers 12 and/or one or more data servers 10 and generates neighborhood scoring data 502.

The other neighborhood data 502 can include neighborhood demographic data, lists of neighborhoods and corresponding street addresses or other coordinates to determine if a particular service address falls within a neighborhood. The other neighborhood data 502 can include aggregate credit scores or other payment indications of the neighborhood, crime statistics for a neighborhood, or other neighborhood information that could bear generally on the suitability of a general service address in the neighborhood as a potential customer. The contractor review data 510 is aggregated by the neighborhood scoring module 500 on a neighborhood by neighborhood basis to reflect aggregate ratings for the different service addresses in the neighborhood.

In a mode of operation, the neighborhood scoring data 502 can include a neighborhood service score that indicates, on an aggregate basis, either generally or on a service type or specific service basis, an estimate for a potential service experience for any general address in the neighborhood. Contractor review data 510 in the form of problems reported, poor contractor reviews, a lack of problems, good contractor reviews and other contractor review data 510 are combined with other neighborhood data 512 to yield these estimates.

In an embodiment, contractor review data 510 is weighted equally for each review and for each contractor or other user that was the source of the review. In another embodiment, contractor review data 510 is weighted unequally. For example, contractor review data 510 can be weighted on a contractor-by-contractor basis based on factors such as the length of service of the contractor or other user, the length of subscription of the contractor to the contractor data server application 250, the number of reviews by the contractor, the frequency of reviews by the contractor, an average review score of the contractor and other factors that could indicate the accuracy of the review.

In another mode of operation, the neighborhood scoring data 502 can include a neighborhood repair score that indicates, on an aggregate basis, an estimate for the frequency of repairs, an amount of repairs or other services or an estimate of future repairs or frequency of repairs, either generally or by service type or specific service basis for any general address in the neighborhood.

FIG. 9 presents a block diagram representation of an individual scoring module 530 in accordance with an embodiment of the present disclosure. In particular, individual scoring module 530 can be implemented as part of the contractor data server application 250 or otherwise executed by processing module 230 of contractor data server 25. In operation, the individual scoring module 500 receives contractor data 510 from the contractor data server application 250 in the form of customer name data, service address data, service data date, service type data, specific service data and contractor review data and further receives neighborhood scoring data 502 and optionally personal data 534 from one or more data servers 10 and generates individual scoring data 532.

The personal data 534 can include personal demographic data, credit scores or other payment indications of the customer, a criminal record for the customer, or other personal information related to either a service address or customer name that could bear generally on the suitability of the person or service address as a potential customer. The contractor review data 510 is aggregated by the individual scoring module 530 on a service address or customer name basis to reflect overall all contractor reviews for that customer name or for that service address.

In a mode of operation, the individual scoring data 532 can include an individual service score for each customer name or service address that indicates an estimate for a potential service experience for that particular address or customer. Contractor review data 510 in the form of problems reported, poor contractor reviews, a lack of problems, good contractor reviews and other contractor review data can be processed in this regard.

In an embodiment, contractor review data 510 is weighted equally. In another embodiment, contractor review data 510 is weighted unequally. For example, contractor review data 510 can be weighted on a contractor-by-contractor basis based on factors such as the length of service of the contractor, the length of subscription of the contractor to the contractor data server application, the number of reviews by the contractor, the frequency of reviews by the contractor, an average review score of the contractor and other factors that could indicate the accuracy of the review.

In an embodiment, the contractor review data 510 is optionally combined with neighborhood scoring data 502 to yield the individual service score. For example, the individual service score can be generated based on a weighted average of the contractor review data 510 and a neighborhood service score that indicates an estimate for a potential service experience for any general address in the neighborhood. Representing the individual service score by $I_s$, the contractor review data by C and the neighborhood service score by $N_s$, $$I_s = \alpha_s C + (1-\alpha_s)N_s$$

Where, $\alpha_s$ is a value that is a monotonically increasing function of the number of contractor reviews for the service address or customer name. In this fashion, the contractor reviews are weighted more heavily when there are a large number of contractor reviews, compared to when there are a small number of contractor reviews. When there are no contractor reviews, the value of $\alpha_s=0$, the individual service score can be based solely on the neighborhood service score, $N_s$.

In another embodiment, the individual service score can be generated based on a weighted average of the contractor review data 510, the neighborhood scoring data 502, and personal data 534 in the form of a credit score for the customer. Representing the credit score as S, $$I_s = \alpha_s C + (1-\alpha_s-\beta_s)N_s + \beta_s S_s$$

where $\beta_s$ is a weighting value.

In another mode of operation, the individual scoring data 532 can include an individual repair score that indicates for a particular service address, an estimate for the frequency of repairs, an amount of repairs or other services or an estimate of future repairs or frequency of repairs, either generally or by service type for that particular address. While the individual repair score can be based solely on customer review data for a particular customer address, this data may be incomplete if not all contractors subscribe to the contractor data service application 250 or other scenarios where contractor review data is not provided for all repairs. To account for this deficiency, the contractor review data 510 is optionally combined with neighborhood scoring data 502 to yield the individual repair score. For example, the individual repair score can be generated based on a weighted average of the contractor review data 510 and a neighborhood repair score that indicates an estimate of the number or frequency of repairs for any general address in the neighborhood. Representing the individual repair score by $I_r$, the contractor review data by C and the neighborhood repair score by $N_r$, $$I_r = \alpha_r C + (1-\alpha_r)N_r$$

Where, $\alpha_r$ is a value that is a monotonically increasing function of the number of contractor reviews for the service address or customer name. In this fashion, the contractor reviews are weighted more heavily when there are a large number of contractor reviews, compared to when there are a small number of contractor reviews. When there are no contractor reviews, the value of $\alpha_r=0$, the individual repair score can be based solely on the neighborhood repair score, $N_r$.

In a further embodiment, the individual repair score is generated in comparison to the corresponding neighborhood repair score. In this fashion, a particular address is compared with other addresses in the neighborhood to determine if more or less repairs have been made. In one example, $$I_r = C/N_r$$

In this case, an $I_r$ value of approximately one would indicate that repairs have been in line with other home in the neighborhood. A high value of Ir could indicate one or more chronic repair problems. A lower high value of $I_r$ could indicate an address where routine maintenance has not been performed.

Figure 10:
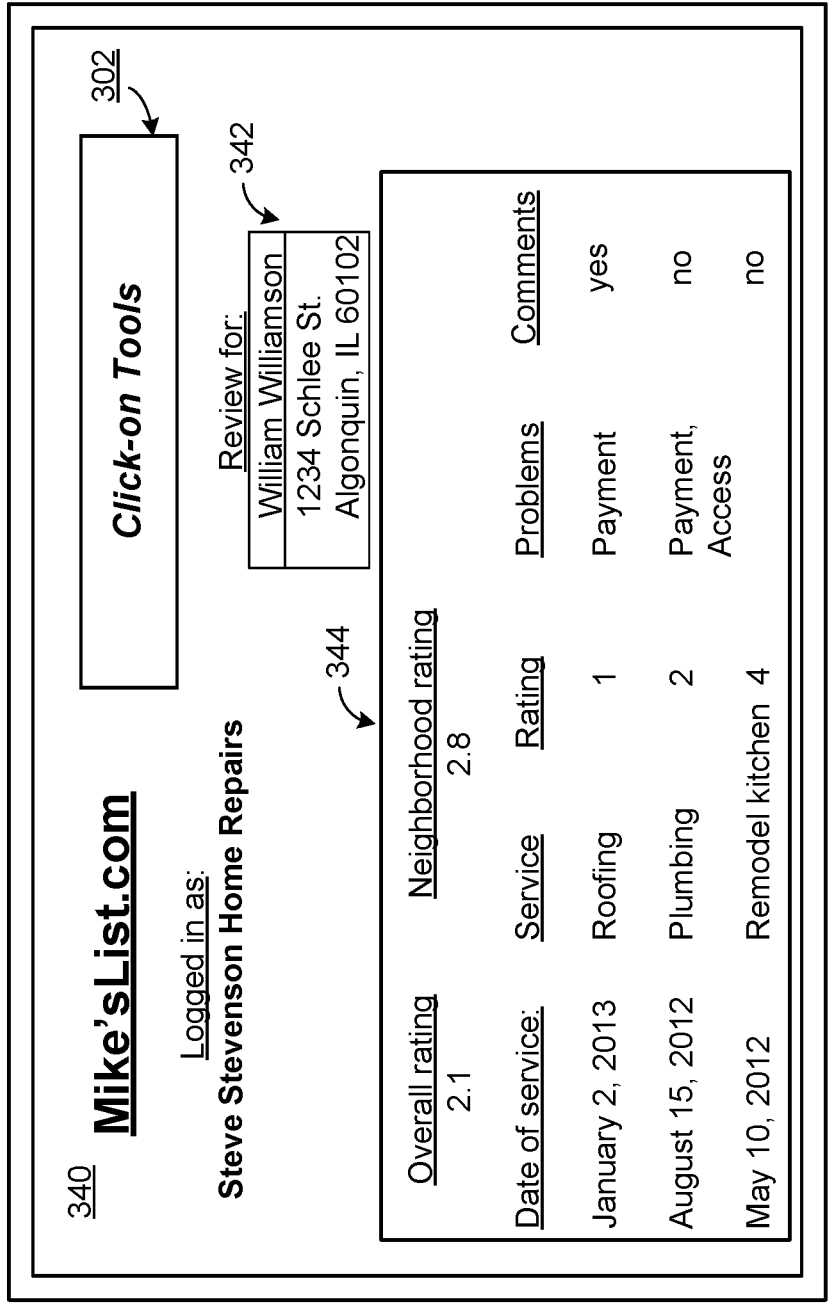
FIG. 10 presents a graphical representation of screen display 340 in accordance with an embodiment of the present disclosure.

FIG. 10 presents a graphical representation of screen display 340 in accordance with an embodiment of the present disclosure. In particular, a screen display 340 of user interface 142 of client device 100 is presented as generated by the contractor data client application 150 in response to contractor data from the contractor data server application 250. Common elements from other figures may be indicated by common reference numerals. The screen display 340 is screen display presented to a user in viewing contractor review data 510, neighborhood scoring data 502 and individual scoring data 532 pertaining to a particular service address.

Screen display 340 reflects that the user Steve Stevenson Home Repairs has logged in and has selected a customer name and/or particular service address to be reviewed in fields 342. While both fields are presented in the example shown, it should be noted that the user may enter only one of these two fields and the system may supply the other based on data in database 246 of data contractor server 25. Contractor data in the form of individual scoring data, neighborhood scoring data and contractor review data is retrieved from the database 246 by the contractor data server application 250 and is presented for display in field 344.

In the example shown, the "Overall rating" is an individual service score that indicates an estimate for a potential service experience for the selected address and/or the selected customer. While the individual service score is presented as a numerical rating, it can be calculated as a numerical rating and displayed visually by a graph, icon, color scheme, or other graphic or text that corresponds to the rating. For example, a stop sign may be presented for a poor rating, a graph with a number of stars may indicate the score, a thumbs up may indicate a good rating or other schemes may be used to indicate the score.

In the example shown, the "Neighborhood rating" is a neighborhood service score that indicates an estimate for a potential service experience for any general address in a neighborhood that contains the selected address. In operation, the contractor data server application locates the neighborhood rating pertaining to the selected address by correlating the selected address to lists of addresses in the database 246 that correspond to different neighborhoods. While the neighborhood service score is presented as a numerical rating, it can be calculated as a numerical rating and displayed visually by a graph, icon, color scheme, or other graphic or text that corresponds to the rating. For example, a stop sign may be presented for a poor rating, a graph with a number of stars may indicate the score, a thumbs up may indicate a good rating or other schemes may be used to indicate the score.

While a neighborhood service score is presented along with an individual service score, the neighborhood service score can be generated based at least in part on the neighborhood service score as discussed in conjunction with FIG. 9.

In the example shown, contractor review data is presented in field 344 that summarized repairs performed on the property. This includes contractor review data in the form of service date data, service data in the form or either service type data or specific service data, a service rating given by the contractor performing the service, and a problem summary. In addition, a comments field indicates if comments are present for viewing. Clicking on each "yes" in this column presents a link to a display screen, not specifically shown, that provides the comments corresponding to the corresponding date of service.

In operation, a user can access contractor review data of the type shown and, for example, evaluate the contractor review data 510, the neighborhood service score and the individual service score in order to estimate a potential service experience for the selected address and/or the selected customer. In this fashion, if a potential customer at the service address asks the contractor to perform the service, the contractor can decide how to bid a potential job, clarify possible sources of customer discord, include addition contract language that addresses potential problems and/or deny service altogether to avoid or mitigate a possible negative service experience for the contractor.

Figure 11:
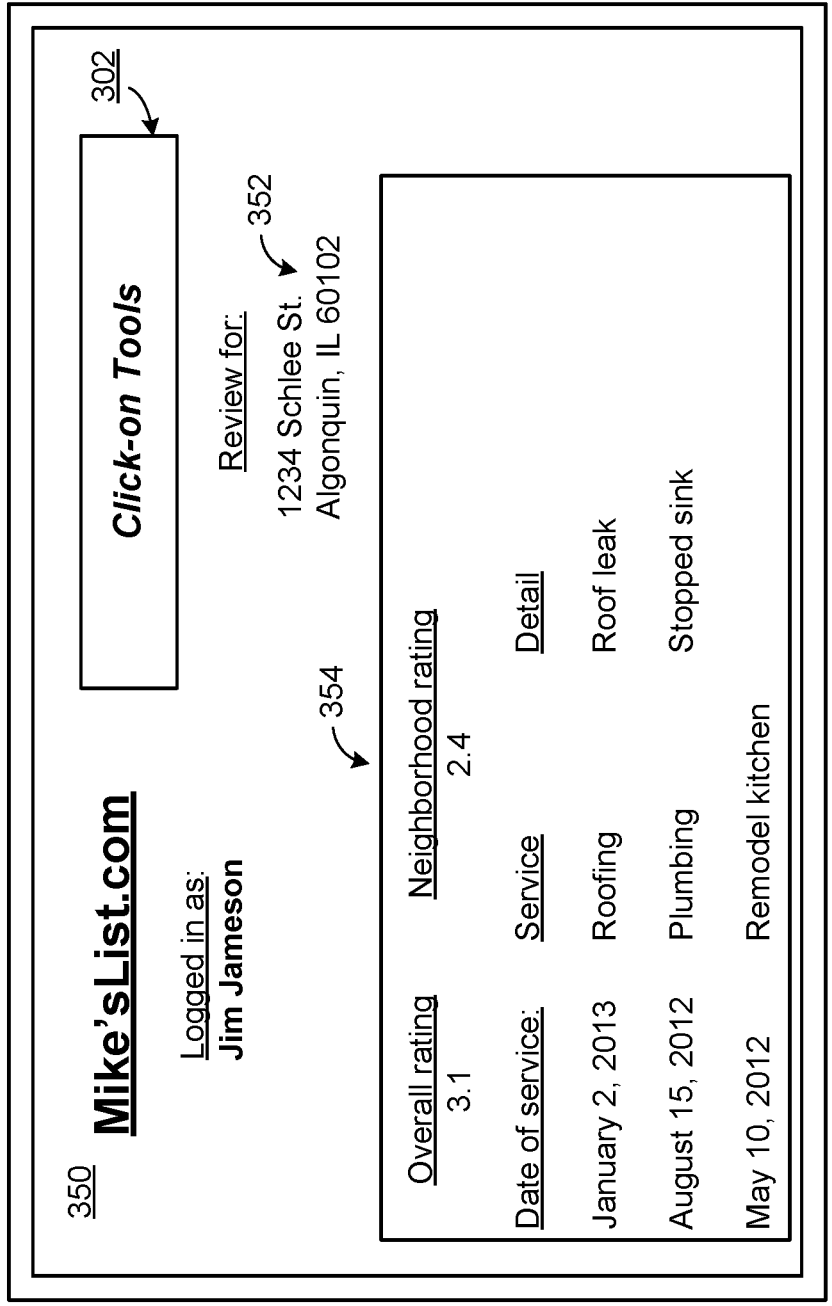
FIG. 11 presents a graphical representation of screen display 350 in accordance with an embodiment of the present disclosure.

FIG. 11 presents a graphical representation of screen display 350 in accordance with an embodiment of the present disclosure. In particular, a screen display 350 of user interface 142 of client device 100 is presented as generated by the contractor data client application 150 in response to contractor data from the contractor data server application 250. Common elements from other figures may be indicated by common reference numerals. The screen display 350 is screen display presented to a user in viewing contractor review data 510, neighborhood scoring data 502 and individual scoring data 532 pertaining to a particular service address.

Screen display 350 reflects that the user Jim Jameson has logged in and has selected a particular service address to be reviewed in fields 352. Contractor data in the form of individual scoring data, neighborhood scoring data and contractor review data is retrieved from the database 246 by the contractor data server application 250 and is presented for display in field 354.

In the example shown, the "Overall rating" is an individual repair score that indicates an estimate of the number of repairs or repair/service frequency for the selected address. While the individual service score is presented as a numerical rating, it can be calculated as a numerical rating and displayed visually by a graph, icon, color scheme, or other graphic or text that corresponds to the rating. For example, a stop sign may be presented for a poor rating, a graph with a number of stars may indicate the score, a thumbs up may indicate a good rating or other schemes may be used to indicate the score.

In the example shown, the "Neighborhood rating" is a neighborhood repair score that indicates an estimate of the number of repairs or repair/service frequency for any general address in a neighborhood that contains the selected address. In operation, the contractor data server application locates the neighborhood rating pertaining to the selected address by correlating the selected address to lists of addresses in the database 246 that correspond to different neighborhoods. While the neighborhood service score is presented as a numerical rating, it can be calculated as a numerical rating and displayed visually by a graph, icon, color scheme, or other graphic or text that corresponds to the rating. For example, a stop sign may be presented for a poor rating, a graph with a number of stars may indicate the score, a thumbs up may indicate a good rating or other schemes may be used to indicate the score.

The user may compare the overall rating to the neighborhood rating. A higher overall rating might indicate one or more chronic repair problems. A lower overall rating could indicate an address where routine maintenance has not been performed. Either of these potential problem areas could be investigated by either further review of the contractor review data or by focusing a home inspection on sources of potential problems.

In the example shown, contractor review data is presented in field 354 that summarized repairs performed on the property. This includes contractor review data in the form of service date data, service data in the form or either service type data and/or specific service data.

In operation, a user, such as a potential home buyer can evaluate contractor review data of the type shown and, for example, determine the type of repairs and maintenance that has been performed and the frequency of such repairs and maintenance. Dates of upgrades, such as a remodel can be evaluated to determine the age of appliances and fixtures. Sources of potential future problems such as water leaks can be evaluated and can be used by the potential homeowner to focus a home inspection on issues that have arisen in the past or to identify a home with costly or chronic defects.

Figure 12:
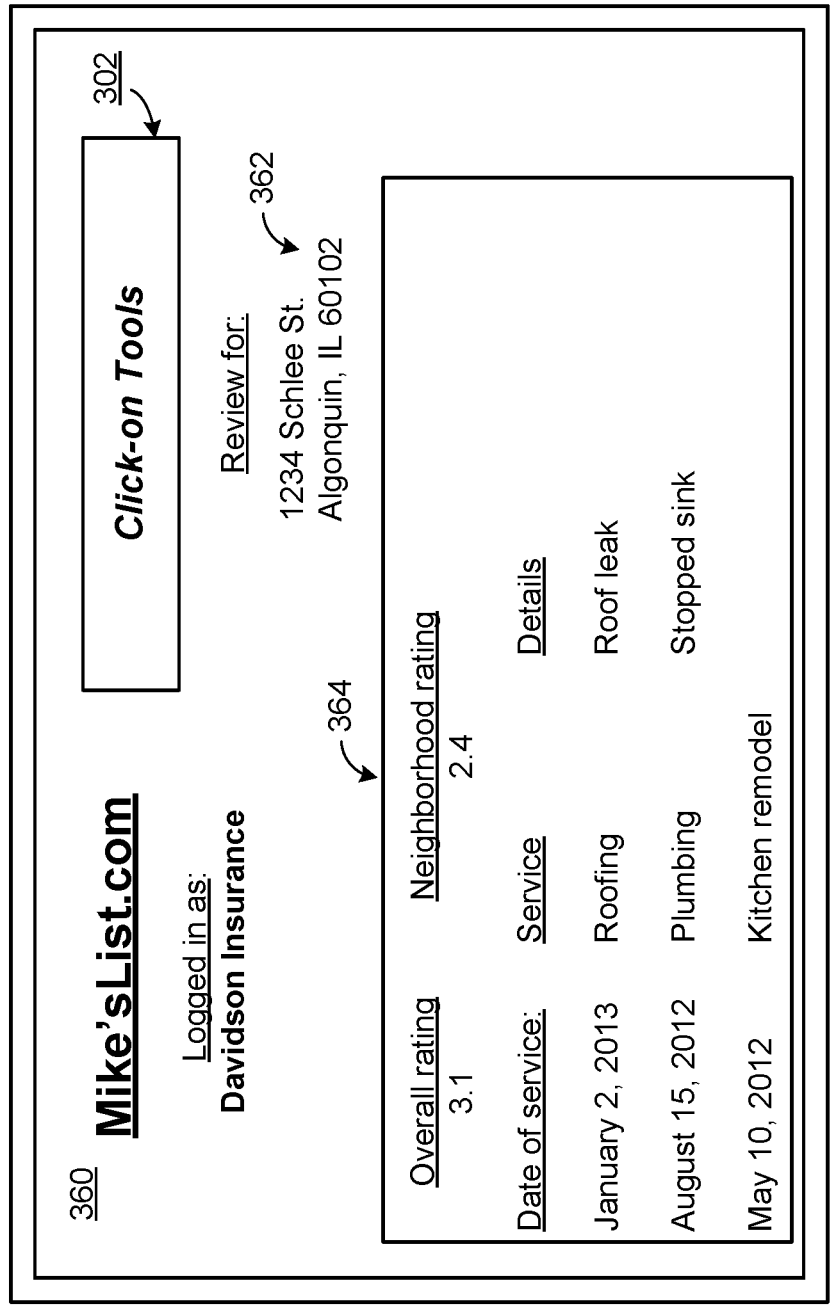
FIG. 12 presents a graphical representation of screen display 360 in accordance with an embodiment of the present disclosure.

FIG. 12 presents a graphical representation of screen display 360 in accordance with an embodiment of the present disclosure. In particular, a screen display 360 of user interface 142 of client device 100 is presented as generated by the contractor data client application 150 in response to contractor data from the contractor data server application 250. Common elements from other figures may be indicated by common reference numerals. The screen display 360 is screen display presented to a user in viewing contractor review data 510, neighborhood scoring data 502 and individual scoring data 532 pertaining to a particular service address.

Screen display 360 reflects that the user Davidson Insurance has logged in and has selected a particular service address to be reviewed in fields 362. Contractor data in the form of individual scoring data, neighborhood scoring data and contractor review data 510 is retrieved from the database 246 by the contractor data server application 250 and is presented for display in field 364.

In the example shown, the "Overall rating" is an individual repair score that indicates an estimate of the number of repairs or repair/service frequency for the selected address. While the individual service score is presented as a numerical rating, it can be calculated as a numerical rating and displayed visually by a graph, icon, color scheme, or other graphic or text that corresponds to the rating. For example, a stop sign may be presented for a poor rating, a graph with a number of stars may indicate the score, a thumbs up may indicate a good rating or other schemes may be used to indicate the score.

In the example shown, the "Neighborhood rating" is a neighborhood repair score that indicates an estimate of the number of repairs or repair/service frequency for any general address in a neighborhood that contains the selected address. In operation, the contractor data server application locates the neighborhood rating pertaining to the selected address by correlating the selected address to lists of addresses in the database 246 that correspond to different neighborhoods. While the neighborhood service score is presented as a numerical rating, it can be calculated as a numerical rating and displayed visually by a graph, icon, color scheme, or other graphic or text that corresponds to the rating. For example, a stop sign may be presented for a poor rating, a graph with a number of stars may indicate the score, a thumbs up may indicate a good rating or other schemes may be used to indicate the score.

The user may compare the overall rating to the neighborhood rating. A higher overall rating might indicate one or more chronic repair problems. A lower overall rating could indicate an address where routine maintenance has not been performed. In the example shown, contractor review data is presented in field 364 that summarized repairs performed on the property. This includes contractor review data in the form of service date data, service data in the form or either service type data and/or specific service data.

In operation, a user, such as a potential insurer can evaluate contractor review data of the type shown and, for example, determine the type of repairs and maintenance that has been performed and the frequency of such repairs and maintenance. Dates of upgrades, such as a remodel can be evaluated to determine the age of appliances and fixtures. Sources of potential future problems such as water leaks can be evaluated and can be used by the potential insurer to identify possible pre-existing conditions and/or rate the property address for potential home warranty protection, homeowners insurance or other insurance.

In another example, a user, such as a property taxing authority can evaluate contractor review data 510 of the type shown and, for example, determined dates of upgrades, such as a remodel can be evaluated to determine the state of the home and its current value. For example, a home with a recent kitchen remodel may be assessed a higher value than other homes in the neighborhood that lack such upgrades.

Figure 13:
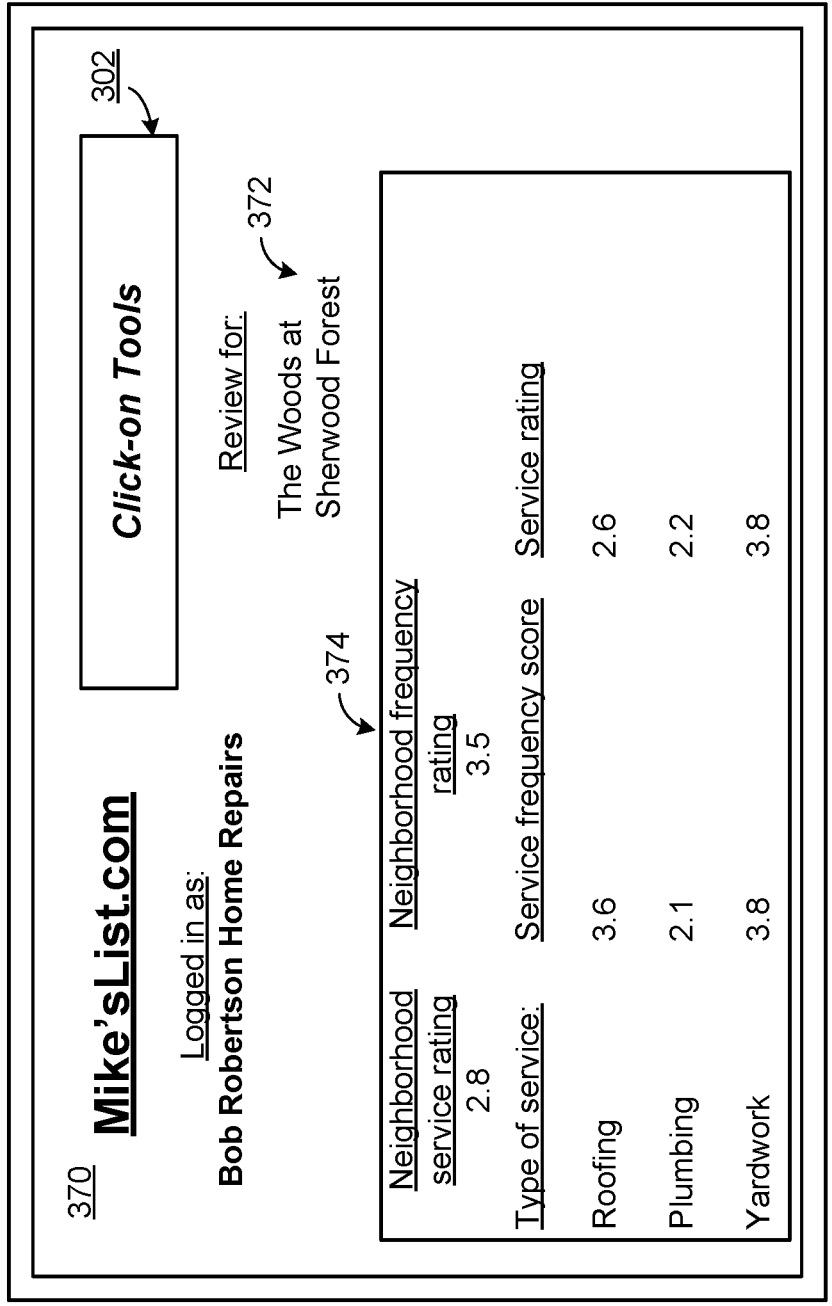
FIG. 13 presents a graphical representation of screen display 370 in accordance with an embodiment of the present disclosure.

FIG. 13 presents a graphical representation of screen display 370 in accordance with an embodiment of the present disclosure. In particular, a screen display 370 of user interface 142 of client device 100 is presented as generated by the contractor data client application 150 in response to contractor data from the contractor data server application 250. Common elements from other figures may be indicated by common reference numerals. The screen display 370 is screen display presented to a user in viewing contractor review data 510 and neighborhood scoring data 502 pertaining to a particular neighborhood.

Screen display 370 reflects that the user Bob Robertson Home repairs has logged in and has selected a particular neighborhood to be reviewed in field 372. Contractor data in the form of neighborhood scoring data 502 is retrieved from the database 246 by the contractor data server application 250 and is presented for display in field 374.

In the example shown, the "Neighborhood service rating" is an overall neighborhood service score that indicates an estimate for a potential service experience for any general address in the selected neighborhood. "Neighborhood frequency rating" is an overall neighborhood repair score that indicates an estimate of the number of repairs or repair/service frequency for the selected neighborhood. While the neighborhood service and repair scores are each presented as a numerical rating, these values can be calculated as a numerical rating and displayed visually by a graph, icon, color scheme, or other graphic or text that corresponds to the rating. For example, a stop sign may be presented for a poor rating, a graph with a number of stars may indicate the score, a thumbs up may indicate a good rating or other schemes may be used to indicate these scores.

As discussed in conjunction with FIG. 8, the neighborhood scoring data 502 can include a neighborhood repair and service score that indicate, on an aggregate basis, an estimate for the frequency of repairs, an amount of repairs or other services or an estimate of future repairs or frequency of repairs, broken down by service type or specific service for a particular neighborhood. In the example shown, further neighborhood scoring data 502 is presented in field 374 that summarizes repairs performed on properties in the selected neighborhood. This includes neighborhood repair and service scores represented respectively as "service frequency score" and "service rating" as broken down by the service type data. While not specifically shown, the neighborhood scoring data presented in field 374 can be broken down by specific services, in addition to or in alternative to, being broken down by service type.

In operation, a user, such as a contractor can evaluate neighborhood scoring data 502 of the type shown and, for example, determine the desirability of a particular neighborhood for the type or types of services or the specific services that the contractor performs. This information can be used by the contractor for marketing purposes to determine the focus of marketing campaigns, to identify likely customers, etc.

The examples presented in conjunction with FIGS. 10-13 have presented access to contractor review data 510, neighborhood scoring data 502 and/or individual scoring data 532 by different types of users. In an embodiment, the contractor data server application 250 classifies users by different subscription levels or classes of service. The type of data that can be accessed by a particular user can optionally be filtered by subscription level or class of service and further the display screens can be customized to provide access to the type or types of data most pertinent to each type of use. In this fashion, when a user logs in, the contractor data server application 250 identifies the user and the associated subscription level and/or class of service and provides access to the data associated with that subscription level and/or class of service in a format that may be customized to that subscription level and/or class of service.

Figure 14:
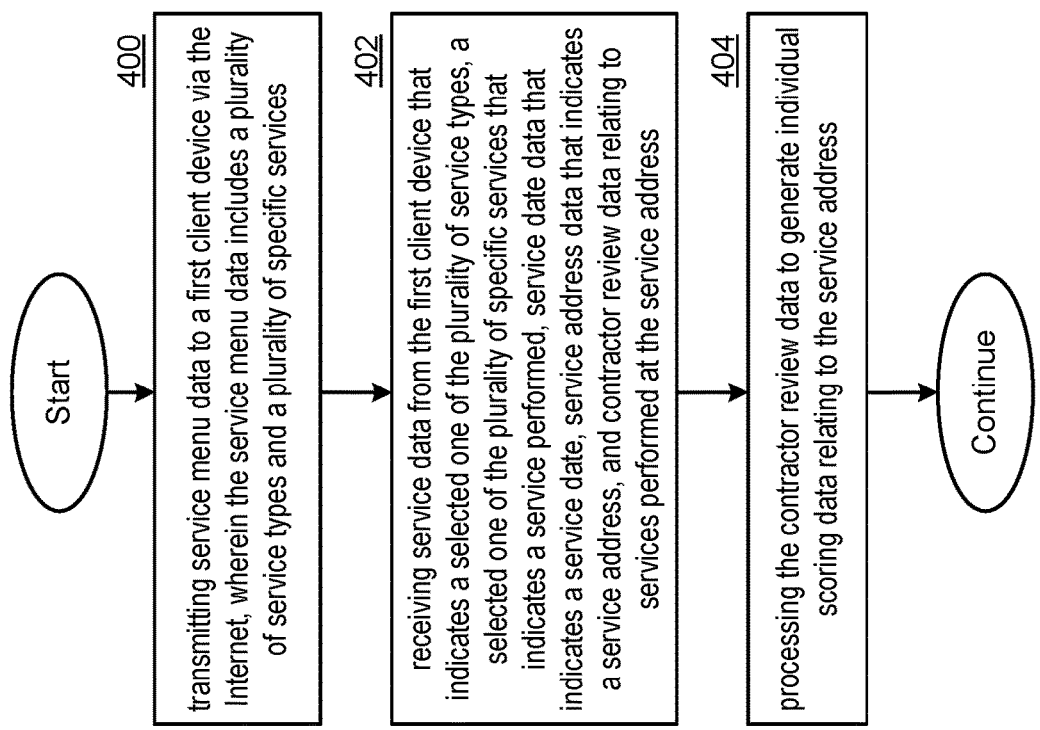
FIG. 14 presents a flowchart representation of a method in accordance with an embodiment of the present disclosure.

FIG. 14 presents a flowchart representation of a method in accordance with an embodiment of the present disclosure. In particular, a method is presented for use in conjunction with one or more functions and features described in FIGS. 1-13. Step 400 includes transmitting service menu data to a first client device via the Internet, wherein the service menu data includes a plurality of service types and a plurality of specific services. Step 402 includes receiving service data from the first client device that indicates a selected one of the plurality of service types, a selected one of the plurality of specific services that indicates a service performed, service date data that indicates a service date, service address data that indicates a service address, and contractor review data relating to services performed at the service address. Step 404 includes processing the contractor review data to generate individual scoring data relating to the service address.

In an embodiment, the contractor review data is processed in conjunction with other contractor review data from at least one other user to generate individual scoring data relating to the service address. The contractor review data can be processed in conjunction with neighborhood scoring data from at least one other service address to generate individual scoring data relating to the service address. Individual scoring data can include or be based on at least a portion of the contractor review data.

In an embodiment the method further includes retrieving personal data pertaining to a person associated with the service address. The contractor review data can be processed in conjunction with the personal data to generate individual scoring data relating to the service address.

In an embodiment the method further includes sending the individual scoring data to a second user of a second client device via the Internet. The individual scoring data can estimate homeowner conduct with contractors at the service address. The method can further include sending the selected one of the plurality of specific services, the service date data, and the service address data with a second user of a second client device via the Internet. Processing the contractor review data can include generating repair summary data that summarizes repairs performed at the service address. The method can further include generating neighborhood scoring data relating to the service address.

As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present disclosure has been described above with the aid of method steps illustrating the performance of specified functions and relationships thereof. The boundaries and number of these functional building blocks and method steps have been arbitrarily defined herein for convenience of description. Alternate boundaries and numbers can be defined so long as the specified functions and relationships are appropriately performed. Any such alternate boundaries or numbers are thus within the scope and spirit of the claimed disclosure. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and number could have been defined otherwise and still perform the certain significant functionality. Such alternate definitions of both functional building blocks and flow diagram blocks and numbers are thus within the scope and spirit of the claimed disclosure. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present disclosure may have also been described, at least in part, in terms of one or more embodiments. An embodiment of the present disclosure is used herein to illustrate the present disclosure, an aspect thereof, a feature thereof, a concept thereof, and/or an example thereof. A physical embodiment of an apparatus, an article of manufacture, a machine, and/or of a process that embodies the present disclosure may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present disclosure. A module includes a processing module, a functional block, hardware, and/or software stored on memory for performing one or more functions via hardware as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present disclosure have been expressly described herein, other combinations of these features and functions are likewise possible. The present disclosure is not limited by the particular examples disclosed herein and expressly incorporates these other combinations.

What is claimed is:

1. A system comprising:
    a network interface for communicating via a network;
    a memory that stores a contractor data server application;
    a processing module, coupled to the memory and the network interface, the processing module including at least one processor that executes the contractor data server application to bidirectionally communicate contractor data with a first client device via the network interface, wherein the contractor data includes service data received from the first client device that indicates a selected one of a plurality of service types, a selected one of a plurality of specific services that indicates a service performed, service date data that indicates a service date, service address data that indicates a service address, and contractor review data relating to services performed at the service address;
    wherein the contractor data server application generates neighborhood scoring data for a neighborhood that includes the service address;
    wherein the contractor data server application processes the contractor review data in conjunction with neighborhood scoring data from at least one other service address to generate individual scoring data relating to the service address, wherein the individual scoring data estimates homeowner conduct with contractors at the service address;
    wherein generating the individual scoring data includes assigning a first weight to aggregate contractor review data for the service address that includes the contractor review data and assigning a second weight to the neighborhood scoring data, and wherein a weight differential between the first weight and the second weight is a monotonically increasing function of a number of contractor reviews for the service address; and
    wherein the contractor data server application sends the individual scoring data a second client device via the network interface.

2. The system of claim 1 wherein the contractor data server application processes the contractor review data in conjunction with other contractor review data from at least one other user to the generate individual scoring data relating to the service address.

3. The system of claim 1 wherein the contractor data server application retrieves personal data pertaining to a person associated with the service address and the contractor data server application processes the contractor review data in conjunction with the personal data to the generate individual scoring data relating to the service address.

4. The system of claim 1 wherein the individual scoring data includes at least a portion of the contractor review data.

5. The system of claim 1 wherein the contractor data server application sends the selected one of the plurality of specific, the service date data, and the service address data to the second client device via the network interface.

6. The system of claim 1 wherein the contractor data server application generates repair summary data that summarizes repairs performed at the service address.

7. A method for use with a contractor data server, the method comprising:
    receiving service data from a first client device that indicates a selected one of a plurality of service types, a selected one of a plurality of specific services that indicates a service performed, service date data that indicates a service date, service address data that indicates a service address, and contractor review data relating to services performed at the service address; and
    processing the contractor review data in conjunction with neighborhood scoring data from at least one other service address to generate individual scoring data relating to the service address;
    wherein generating the individual scoring data includes assigning a first weight to aggregate contractor review data for the service address that includes the contractor review data and assigning a second weight to the neighborhood scoring data, and wherein a weight differential between the first weight and the second weight is a monotonically increasing function of a number of contractor reviews for the service address; and
    sending the individual scoring data to a second user of a second client device via a network interface for display on a screen associated with the second client device.

8. The method of claim 7 wherein the contractor review data is processed in conjunction with other contractor review data from at least one other user to the generate individual scoring data relating to the service address.

9. The method of claim 7 further comprising:
    retrieving personal data pertaining to a person associated with the service address; and
    wherein the contractor review data is processed in conjunction with the personal data to the generate individual scoring data relating to the service address.

10. The method of claim 7 wherein the individual scoring data includes at least a portion of the contractor review data.

11. The method of claim 7 wherein the individual scoring data estimates homeowner conduct with contractors at the service address.

12. The method of claim 7 further comprising:
    sending the selected one of the plurality of specific services, the service date data, and the service address data to the second user of the second client device via the internet.

13. The method of claim 7 processing the contractor review data further includes generating repair summary data that summarizes repairs performed at the service address.

14. The method of claim 7 further comprising:
generating neighborhood scoring data relating to the service address.

15. A method for use with a contractor data server, the method comprising:
receiving service data from a first client device that indicates a selected one of a plurality of service types, a selected one of a plurality of specific services that indicates a service performed, service date data that indicates a service date, service address data that indicates a service address, and contractor review data relating to services performed at the service address; and
processing the contractor review data in conjunction with neighborhood scoring data from at least one other service address to generate individual scoring data relating to the service address, wherein the individual scoring data includes at least a portion of the contractor review data, and wherein the individual scoring data also estimates homeowner conduct with contractors at the service address;
wherein generating the individual scoring data includes assigning a first weight to aggregate contractor review data for the service address that includes the contractor review data and assigning a second weight to the neighborhood scoring data, and wherein a weight differential between the first weight and the second weight is a monotonically increasing function of a number of contractor reviews for the service address; and
sending the individual scoring data to a second user of a second client device via a network interface for display on a screen associated with the second client device.

16. The method of claim 15 wherein the contractor review data is processed in conjunction with other contractor review data from at least one other user to the generate individual scoring data relating to the service address.

17. The method of claim 15 further comprising:
retrieving personal data pertaining to a person associated with the service address; and
wherein the contractor review data is processed in conjunction with the personal data to the generate individual scoring data relating to the service address.

18. The method of claim 15 wherein processing the contractor review data further includes generating repair summary data that summarizes repairs performed at the service address.

\* \* \* \* \*